United States Patent
Herbstritt et al.

(10) Patent No.: US 10,458,482 B1
(45) Date of Patent: Oct. 29, 2019

(54) SURFACE ROUGHENING OF POWDER METAL PARTS

(71) Applicants: Matthew G. Herbstritt, St. Marys, PA (US); Gary L. Anderson, St. Marys, PA (US)

(72) Inventors: Matthew G. Herbstritt, St. Marys, PA (US); Gary L. Anderson, St. Marys, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 224 days.

(21) Appl. No.: 15/449,153

(22) Filed: Mar. 3, 2017

Related U.S. Application Data

(60) Provisional application No. 62/305,740, filed on Mar. 9, 2016.

(51) Int. Cl.
| | |
|---|---|
| *B22F 5/00* | (2006.01) |
| *F16D 13/64* | (2006.01) |
| *B22F 3/24* | (2006.01) |
| *B22F 3/16* | (2006.01) |
| *B22F 3/03* | (2006.01) |
| *F16D 13/74* | (2006.01) |
| *F16D 13/70* | (2006.01) |
| *F16H 55/06* | (2006.01) |
| *F16H 55/30* | (2006.01) |

(52) U.S. Cl.
CPC ............... *F16D 13/64* (2013.01); *B22F 3/03* (2013.01); *B22F 3/16* (2013.01); *B22F 3/24* (2013.01); *B22F 5/00* (2013.01); *F16D 13/70* (2013.01); *F16D 13/74* (2013.01); *F16H 55/06* (2013.01); *F16H 55/30* (2013.01); *B22F 2003/247* (2013.01)

(58) Field of Classification Search
CPC .......... F16D 13/64; F16D 13/70; F16D 13/74; B22F 3/03; B22F 3/16; B22F 3/24; B22F 5/00; F16H 55/06; F16H 55/30; B22C 9/061; B22D 17/22; C23C 8/22; C23C 8/20; C23C 8/23
See application file for complete search history.

(56) References Cited

U.S. PATENT DOCUMENTS

| | | | |
|---|---|---|---|
| 5,254,184 A * | 10/1993 | Magee, Jr. | ............... C22C 38/58 148/325 |
| 9,188,168 B2 | 11/2015 | Ando et al. | |
| 2003/0148144 A1* | 8/2003 | Gates, Jr. | ............... C23C 16/342 428/698 |

* cited by examiner

*Primary Examiner* — Jessee R Roe
(74) *Attorney, Agent, or Firm* — Alvin T. Rockhill

(57) ABSTRACT

It has been found that metal parts having rough surfaces can be manufactured by (1) compacting a metal powder under high pressure in a mold to make a green part, wherein at least one face of the mold is roughened by electrical discharge machining to have an $R_a$ of 10 to 200 micro-inches, as measured with a profilometer having a stylus tip, (2) heating the green metal part to a temperature of at least 1500° F. to sinter the green metal part to produce the metal part having at least one rough surface, wherein the rough surface has an $R_a$ which is within the range of 10 to 200 micro-inches, as measured with a profilometer having a chisel tip, and (3) optionally, buffing, classifying, deburring and/or washing the metal part. This method can be beneficially used in manufacturing clutch plates, pressure plates, and cam shaft sprockets.

20 Claims, 2 Drawing Sheets

SURFACE ROUGHENING OF POWDER METAL PARTS

This application claims the benefit of U.S. Provisional Patent Application Ser. No. 62/305,740 filed on Mar. 9, 2016. The teachings of U.S. Provisional Patent Application Ser. No. 62/305,740 are incorporated by reference herein in their entirety.

BACKGROUND OF THE INVENTION

It is desirable for metal parts that are used in a wide variety of applications to have one or more surfaces which have a rough surface texture. For instance, it is desirable for clutch plates, pressure plates, camshaft sprockets, crankshaft sprockets, and a wide variety of other parts to include surfaces which are relatively rough. For instance, parts having at least one rough surface are frequently used in applications where the part is adapted for providing non-rotating engagement with another part in an article of manufacture. In such cases, it is also typically desirable for the rough surface of the part to be surface hardened to provide for better engagement with another part having a softer engagement surface. In other cases, it is desirable for a metal part to have at least one rough surface to facilitate subsequent manufacturing or treatment procedures. For instance, it is important for the metal part used in manufacturing clutch plates to have a friction engagement surface which is relatively rough. This rough surface facilitates subsequent treatment to provide a friction engagement surface having the desired characteristics.

Powder metal parts, such as gears, clutch plates and camshaft sprockets can typically be made at a substantially lower cost than like parts that are made by machining wrought and/or forged steel blanks. For this reason, powder metal parts are widely used in manufacturing consumer products, industrial products, automotive applications, agricultural equipment, heavy equipment, and countless other applications. In some of these applications it is beneficial for one or more sides of the part to have a rough surface. However, providing surfaces on such parts with the desired surface texture can prove to be challenging. In fact, in some cases it is not possible to provide a particular surface on a part with the desired surface texture by conventional techniques, such as grinding, sanding, machining with a rough wheel, cutting, sandblasting, micro-blasting, or shot-peening. The problems associated with providing the surface of a part with a rough surface texture is particularly difficult in cases where the area on the part where a rough surface is desired is obstructed or difficult to reach with conventional roughing methods. In general, it is more difficult to provide a particular surface of a part with a desired rough surface texture in cases where the surface is curved, rounded, tapered, non-uniform, or has a highly detailed surface with multiple surface geometries. Roughening a flat surface on a part by conventional techniques can also prove to be difficult or impossible in cases where the flat surface is obstructed, recessed, or otherwise not readily accessible.

There has been and continues to be a long felt need for a better technique for providing surfaces of powder metal parts with desired rough surface textures. A technique that can apply a desired degree of surface roughness to surfaces that are not readily accessible by conventional techniques and to surfaces which are non-uniform, curved, rounded, tapered, or which have multiple surface geometries would be highly desirable. It would also be highly desirable if such a technique was capable of applying a controlled level of roughness in a relatively uniform manner over the surface of the powder metal part.

SUMMARY OF THE INVENTION

This invention relates to a method for applying a rough surface to a powder metal part. The level of surface roughness can be controlled to provide the powder metal part with one or more surfaces having desired levels of surface roughness. This technique can be used to impart surface roughness to surfaces of parts which would be difficult or impossible to attain using conventional methods. For instance, the method of this invention can be used to impart surface roughness to surfaces which are non-uniform, curved, rounded, tapered, or which have multiple surface geometries. It can also be used to impart surface roughness to areas on a part which are obstructed, partially obstructed, recessed, or otherwise not readily accessible. The technique of this invention also provides a superior and relatively uniform roughness over the surface of the part which has surface characteristics which are indicative of electrical discharge machining.

These rough surfaces can be characterized by including a plurality of craters which are distributed in a relatively uniform manner over the rough surface of the part and can be further characterized by being void of machining marks. The rough surface of the part can also be characterized by being void of biaxial and multiaxial surface striations with the rough surface having a surface texture which is axially oriented only in the z direction. These rough surfaces of the powder metal parts of this invention can also be surface hardened by carburization or another technique to provide the rough surface of the part with a higher degree of surface hardness. The part can then be adapted for non-rotational contact in conjunction with a second part having a softer contact surface. In other words, the harder rough surface of the part can better grip into the softer surface of the second part providing a higher degree of non-rotational contact.

In one embodiment of this invention electrical discharge machining is utilized in roughening the surface of a mold which is subsequently used in forming green powder metal parts that are subsequently sintered to make finished parts having at least one rough surface corresponding to the area of the mold which was roughened by the electrical discharge machining. In another embodiment of this invention electrical discharge machining is employed in roughening the surface of a tool having at least one tool face which is roughened by electrical discharge machining. In this embodiment of the invention the tool is subsequently used in coining or sizing the powder metal part to provide the desired rough surface or surfaces on the part. In either embodiment of this invention electrical discharge machining is utilized in a counter-intuitive manner to roughen a mold or a tool used in manufacturing a powder metal part.

The present invention more specifically discloses a process for manufacturing a metal part having at least one rough surface thereon which comprises: (1) compacting a metal powder under high pressure in a mold to make a green preformed part, wherein at least one face of the mold is roughened by electrical discharge machining to have an $R_a$ which is within the range of 10 to 200 micro-inches, as measured with a profilometer having a stylus tip, (2) heating the green metal part to a temperature of at least 1500° F. (816° C.) to sinter the green metal part to produce the metal part having at least one rough surface, wherein the rough surface has an $R_a$ which is within the range of 10 to 200 micro-inches, as measured with a profilometer having a chisel tip, and (3) optionally, buffing, classifying, deburring and/or washing the metal part.

The subject invention also reveals a process for manufacturing a metal part having at least one rough surface thereon which comprises: (1) compacting a metal powder under high pressure in a mold to make a green preformed part, (2) heating the green metal part to a temperature of at least 1500° F. (816° C.) to sinter the green metal part to produce a sintered metal part, (3) sizing or coining the sintered metal part to an $R_a$ which is within the range of 10 to 200 micro-inches, as measured with a profilometer having a chisel tip, with a tool having at least one tool face which is roughened by electrical discharge machining, and (4) optionally, buffing, classifying, deburring and/or washing the metal part.

The present invention further discloses a powder metal part having at least one rough surface thereon, wherein the rough surface has an $R_a$ which is within the range of 10 to 80, as measured with a profilometer having a chisel tip, and wherein the rough surface has surface characteristics which are indicative of electrical discharge machining.

The subject invention also reveals a clutch plate comprising: a friction engagement surface, a plurality of windows, and a spline, wherein the friction engagement surface has a surface roughness having an $R_a$ which is within the range of 10 to 100 microinches, as measured with a profilometer having a chisel tip, and wherein the friction engagement surface has surface characteristics which are indicative of electrical discharge machining.

DETAILED DESCRIPTION OF THE INVENTION

Figure 1:
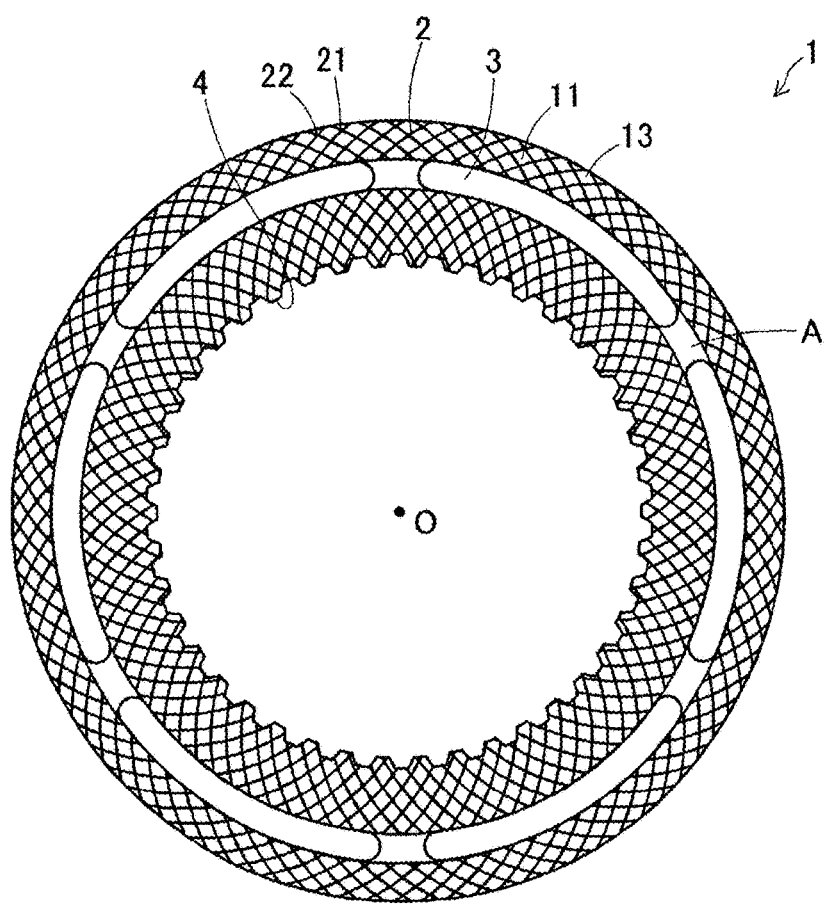
FIG. 1 illustrates a clutch plate that can be manufactured in accordance with this invention.

In the first step employed in manufacturing the powder metal parts of this invention, a green preformed part is made by compacting a powder metal composition in a mold. In this molding process the powder metal composition is introduced into the mold and subsequently compressed under high pressure, typically from 20 to 70 tons per inch (tsi) to produce the compressed part or preform. This preform is then referred to as being green or uncured. In any case, the powder metal is compressed into the general shape desired for the part being manufactured. In one embodiment of this invention the mold will include at least one mold face having a rough surface which was roughened by electrical discharge machining. In another embodiment of this invention a conventional mold is utilized with one or more surfaces of the part being roughened in a subsequent coining or sizing step which employs a tool having one or more tool faces which were roughened by electrical discharge machining.

In either embodiment of this invention the metal powder composition utilized in molding the green metal part will typically be a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together, along with additives such as lubricants and graphite, and molded as a mixture. A second possibility is to use a pre-alloyed powder, such as an iron-nickel-molybdenum steel or an iron-molybdenum-manganese steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder or oxide of a powder, and is subsequently sintered at low temperatures so partial diffusion of the powders occurs. This yields a powder with fairly good compressibility which shows little tendency to separate during processing.

While iron is the most common metal powder, powders of other metals such as aluminum, copper, tungsten, molybdenum and the like may also be used. Also, as used herein, an "iron metal powder" is a powder in which the total weight of iron and iron alloy powder is at least 50 percent of the powder's total weight. While more than 50% of the composition of the parts can consist of iron, the powder may include other elements such as carbon, sulfur, phosphorus, manganese, molybdenum, nickel, silicon, chromium, and copper.

At least four types of metallic iron powders are available for utilization in powder metallurgy. These metallic iron powders include: electrolytic iron, sponge iron, carbonyl iron and nanoparticle sized iron and are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2$/kg), while hydrogen-reduced sponge iron typically has a surface area of about 200 $m^2$/kg. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the green part.

The powder metal compositions used in the practice of this invention can be a pre-alloyed powder, such as an iron-molybdenum-manganese steel powder composition. Such a composition can be void of carbon. However, it should be noted that a small amount of graphite and manganese sulfide can beneficially be included as an internal lubricant. The amount of graphite included as a lubricant is typically consumed during the sintering step and may not be present in the sintered part.

After the green metal part is made it is subsequently sintered by heating in a sintering furnace, such as an electric or gas-fired belt or batch sintering furnace, for a predetermined time at high temperature in an inert environment. Nitrogen, vacuum and Nobel gases, such as helium or argon, are examples of such inert protective environments. Metal powders can be sintered in the solid state with bonding by diffusion rather than melting and re-solidification. Also, sintering may result in a decrease in density depending on the composition and sintering temperature.

Typically, the sintering temperature utilized will be about 60% to about 90% of the melting point of the metal composition being employed. The sintering temperature will normally be in the range of 1500° F. (816° C.) to 2450° F. (1343° C.). The sintering temperature for iron based compacts will more typically be within the range of 2000° F. (1093° C.) to about 2400° F. (1316° C.). The sintering temperature utilized with copper systems will, of course, be considerably lower due to the lower melting point of copper. In any case, the appropriate sintering temperature and time-at-temperature will depend on several factors, including the chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at a temperature which is within the range of 2000° F. to 2450° F. for approximately 30 minutes in a protective atmosphere to sinter the metal. The final density of the part will vary widely depending on its composition and the particular pressing and sintering parameters employed. The average density of a green preform formed from an iron-base metallurgical powder typically is in the range of 6.2 to 7.2 g/cc and may be, for example, 6.8 g/cc.

In the embodiment of this invention where a conventional mold is used in making the green part, a tool having a rough tool face made by electrical discharge machining is employed in coining or sizing of the sintered part. This tool accordingly provides the sintered part with the desired surface texture. The finished part will typically have rough surfaces which have a roughness average ($R_a$) which is about 50% of the roughness average of the rough faces of the tool used in making them.

In either embodiment of this invention after the power metal part is made it can optionally be carburized to harden its surface. This carburization step can be conducted using standard procedures and equipment which are well known to persons skilled in the art. It can also optionally be buffed, classified, deburred and/or washed using standard procedures and equipment to attain the desired surface finish. For instance, the part can be slurry finished to remove burrs that can be present on the surface of the part.

Through a carburization step carbon can be added to the surface of the metal part. It is carried out by exposing the part to a carbon rich environment and maintaining the part at a temperature that allows for diffusion to transfer carbon atoms into the metal. This temperature will be sufficient to maintain the steel as austenite that has a face-centered cubic structure and which has a high solubility for carbon. The carburization will typically be carried out until the carbon content of the steel has been increased to the desired level which will typically be between about 0.5% and 1%. Hardening of the high-carbon surface layer of the steel article is then accomplished by quenching the article to form martensite having enhanced hardness and wear resistance.

Over the years, a number of techniques for carburizing steel articles have been developed. These techniques include gas carburizing, plasma carburizing, salt bath carburizing and liquid carburizing. Gas carburization involves heating the steel part being treated to a temperature above about 1,550° F. (843° C.) to form austenite and maintaining the article at that temperature in a carburizing gas atmosphere for a time that is sufficient to increase the carbon content near the surface of the part to the desired level. The time required for the carbon to diffuse into the steel will typically vary from about four hours to about ten hours. The carburizing gas atmosphere will typically be a mixture of hydrogen and methane in an inert gas or a mixture of carbon monoxide and carbon dioxide in an inert gas. In the first case, the hydrogen/methane ratio and in the second case the carbon monoxide/carbon dioxide ratio is adjusted to give the desired carbon concentration on the surface of the steel being treated. Uniform results can be attained by carefully controlling the ratio of reactive gases and the carburization temperature. Gas carburizing leads to a uniform result with carbon being diffused consistently over the surface of the metal part being treated.

Vacuum carburization utilized a single-component atmosphere consisting solely of a simple hydrocarbon in a gaseous state, such as methane. Vacuum carburization is carried out at low pressure under an oxygen-free environment and offers the advantage of being able to utilize higher carburization temperatures without the risk of surface or grain-boundary oxidation. This, in turn, leads to higher levels of carbon solubility in the austenite formed and to increased rates of carbon diffusion. The time required to attain the desired carbon level at the surface of the part is accordingly reduced.

Even though vacuum carburization eliminates some of the complexities of gas carburization, it is not universally applicable to the treatment of all metal parts. This is because the rate of flow of the carburizing gas into deep recesses in the part is quickly depleted at the low gas pressures used. This leads to an insufficient level of carbon penetration in the steel at such recesses in the structure of the part. Thus, the treated part will not have the desired level of hardness and wear resistance at such points on the surface of the part. It should be noted that this problem typically cannot be overcome by simply increasing the pressure of the carburizing gas because sooting usually results in such a scenario.

In plasma carburization, carbon ions are given a positive charge and the steel part being carburized is provided with a negative charge and acts as the cathode to which the positively charged carbon ions are drawn. Plasma carburization rapidly introduces carbon into the surface of the part and also provides fast diffusion kinetics. Plasma carburization also offers the advantage of providing a very uniform carburization of the part even in cases where the part has deep recesses or other surface irregularities which are difficult to carburize using gas or vacuum carburization techniques.

In liquid carburization, a liquid hydrocarbon is employed as the source of carburizing gas. The liquid hydrocarbon can be an aliphatic or an aromatic hydrocarbon such as hexane, cyclohexane, benzene, or toluene. Oxygenated hydrocarbons such as alcohols, glycols, and ketones are also commonly used as the liquid hydrocarbon source. In such liquid hydrocarbon carburization procedures, the liquid hydrocarbon is fed into a carburization furnace containing the steel part or parts being carburized and volatilizes almost instantaneously at the temperature of the furnace. The vapors of the liquid hydrocarbon source dissociate thermally to provide a carburizing atmosphere that typically contains carbon monoxide, carbon dioxide, methane and other lower alkanes. In the case of oxygenated hydrocarbons water vapor is also typically produced. The flow of the liquid hydrocarbon source into the furnace is adjusted to accurately attain the desired level of carburization.

After being carburized the part is tempered at a temperature which is sufficient to stress relieve the part. This is typically done at a temperature which is within the range of 350° F. (177° C.) to 500° F. (260° C.). The carburized part will more typically be tempered at a temperature which is within the range of 375° F. (191° C.) to 450° F. (232° C.).

The tempered part is then ground to improve accuracy and finish. After being ground the part is typically tape polished to further improve the surface finish of the bearing journal. After being polished the part is typically washed, rinsed with a rust inhibitor, and subsequently dried. At this point the finished part can be packaged for shipping.

In manufacturing the mold or tool employed in the practice of this invention electrical discharge machining, which is frequently referred to by its acronym "EDM", is used to provide a standard mold or tool with at least one roughened mold or tool face. This technique which is also known as "electro-discharge erosion" was originally discovered by Joseph Preistly in the $18^{th}$ century. In the electrical discharge machining process used in the practice of this invention electrical sparks are generated between an electrode (the tool-electrode) and the surface of the part being roughened (the workpiece-electrode). These electric sparks produces a temperature which is typically within the range of 8000° C. to 12,000° C. and which is sufficient to melt the metal surface of the part which is hit by the sparks.

Rapidly recurring current discharges between the tool-electrode and the workpiece-electrode are generated by providing a sufficient electrical voltage to provide electrical discharges of the desired intensity to remove the desired amount of metal from the face of the mold or tool being roughened. The tool-electrode is separated from the workpiece-electrode by an oil-based dielectric fluid which serves to remove eroded material from both the tool-electrode and the workpiece-electrode. The oil-based dielectric fluid also typically serves as a coolant for the process. In any case, the desired rough surface of the mold or tool being made is controlled by the appropriate selection of the tool-electrode, the oil-based dielectric fluid, and the voltage applied. In the practice of this invention, these parameters can be adjusted to attain molds and tools having roughened faces having a roughness average ($R_a$) which is within the range of 10 to 200 micro-inches, as measured with a profilometer having a stylus tip. For instance, the mold or tool can be made to have one or more roughened surfaces having an $R_a$ which is within the range of 20 to 150 micro-inches, 20 to 100 micro-inches, 20 to 80 micro-inches, 20 to 30 micro-inches, 40 to 80 micro-inches, or 60 to 100 micro-inches, as measured with a profilometer having a stylus tip. Such molds can in turn be used in manufacturing parts having roughened surfaces having $R_a$ values which are within these ranges. Tools having $R_a$ values which are within these ranges can in turn be used in coining or sizing parts having roughened surfaces which are within the $R_a$ ranges of 10 to 100 micro-inches, as measured with a profilometer having a chisel tip. For instance, such parts can have roughened surfaces having an $R_a$ value which is within the range of 10 to 80 micro-inches, 20 to 80 micro-inches, 20 to 60 micro-inches, 20 to 40 micro-inches, 20 to 30 micro-inches, 30 to 80 micro-inches, 30 to 60 micro-inches, 30 to 40 micro-inches, 40 to 80 micro-inches, or 40 to 60 micro-inches, as measured with a profilometer having a chisel tip.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Figure 2:
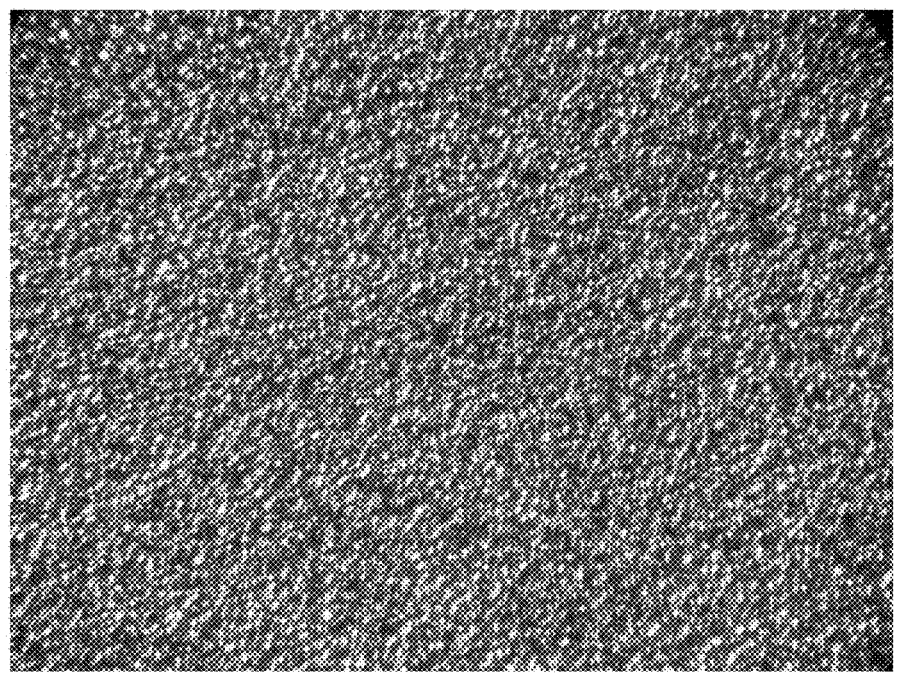
FIG. 2 is an electron micrograph showing the roughened surface of a part made in accordance with this invention.

A clutch plate of the design illustrated in FIG. 1 can be manufacture in accordance with this invention. Such a clutch plate is further described in U.S. Pat. No. 9,188,168. The teachings of U.S. Pat. No. 9,188,168 are incorporated by reference herein for the purpose of describing such a clutch plate. In any case, such a clutch plate 1 will be comprised of a friction engagement surface 13, a plurality of windows 3, and a spline 4. The clutch plate will also typically include lubricating grooves 2, grooves 21, intersection points 22 and empty portions A as illustrated in FIG. 1. The friction engagement surface of the clutch plate will have a surface roughness having an $R_a$ which is within the range of 10 to 100 microinches, as measured with a profilometer having a chisel tip, and will have a friction engagement surface having surface characteristics which are indicative of electrical discharge machining as shown in the FIG. 2. As can be seen in FIG. 2 the friction engagement surface is void of machining marks and has a surface texture which is axially oriented only in the z direction. The friction engagement surface is also void of biaxial and multiaxial surface striations.

While certain representative embodiments and details have been shown for the purpose of illustrating the subject invention, it will be apparent to those skilled in this art that various changes and modifications can be made therein without departing from the scope of the subject invention.

What is claimed is:

1. A powder metal part having at least one rough surface thereon, wherein the rough surface has an $R_a$ which is within the range of 10 to 100, as measured with a profilometer having a chisel tip, and wherein the rough surface has surface characteristics which are indicative of electrical discharge machining, wherein the rough surface has a surface texture which is axially oriented only in the z direction.

2. The powder metal part as specified in claim 1 wherein the rough surface includes a plurality of craters which are distributed in a uniform manner over the rough surface and wherein the rough surface is void of machining marks.

3. The powder metal part as specified in claim 1 wherein the rough surface is void of biaxial and multiaxial surface striations.

4. The powder metal part as specified in claim 1 wherein the rough surface of the powder metal part is a flat surface.

5. The powder metal part as specified in claim 1 wherein the rough surface of the powder metal part is a rounded surface.

6. The powder metal part as specified in claim 1 wherein the rough surface of the powder metal part is surface hardened by carburization.

7. The powder metal part as specified in claim 1 wherein the rough surface of the powder metal part has an $R_a$ which is within the range of 20 to 40 micro-inches, as measured with a profilometer having a chisel tip.

8. The powder metal part as specified in claim 1 wherein the rough surface of the powder metal part has an $R_a$ which is within the range of 40 to 80 micro-inches, as measured with a profilometer having a chisel tip.

9. The powder metal part as specified in claim 1 wherein the rough surface of the powder metal part has an $R_a$ which is within the range of 30 to 60 micro-inches, as measured with a profilometer having a chisel tip.

10. The powder metal part as specified in claim 1 wherein the rough surface of the powder metal part has an $R_a$ which is within the range of 20 to 80 micro-inches, as measured with a profilometer having a chisel tip.

11. A powder metal part having at least one rough surface thereon, wherein the rough surface has an $R_a$ which is within the range of 10 to 100, as measured with a profilometer having a chisel tip, and wherein the rough surface has surface characteristics which are indicative of electrical discharge machining, wherein the powder metal part is a pressure plate.

12. A powder metal part having at least one rough surface thereon, wherein the rough surface has an $R_a$ which is within the range of 10 to 100, as measured with a profilometer having a chisel tip, and wherein the rough surface has surface characteristics which are indicative of electrical discharge machining, wherein the powder metal part is a cam shaft sprocket.

13. A powder metal part having at least one rough surface thereon, wherein the rough surface has an $R_a$ which is within the range of 10 to 100, as measured with a profilometer having a chisel tip, and wherein the rough surface has surface characteristics which are indicative of electrical discharge machining, wherein the rough surface of the powder metal part is surface hardened and is adapted for non-rotation in conjunction with a second part having a softer surface.

14. A clutch plate which is comprised of a friction engagement surface, a plurality of windows, and a spline, wherein the friction engagement surface has a rough surface, wherein the rough surface has surface roughness having an $R_a$ which is within the range of 10 to 100 microinches, as measured with a profilometer having a chisel tip, and wherein the rough surface has surface characteristics which are indicative of electrical discharge machining.

15. The clutch plate as specified in claim 14 wherein the friction engagement surface includes a plurality of craters which are distributed in a uniform manner over the friction engagement surface, and wherein the friction engagement surface is void of machining marks.

16. The clutch plate as specified in claim 14 wherein the friction engagement surface has a surface texture which is axially oriented only in the z direction.

17. The clutch plate as specified in claim 14 wherein the friction engagement surface is void of biaxial and multiaxial surface striations.

18. The clutch plate as specified in claim 14 wherein the friction engagement surface has a surface roughness having an $R_a$ which is within the range of 20 to 60 micro-inches, as measured with a profilometer having a chisel tip.

19. The clutch plate as specified in claim 14 wherein the friction engagement surface has a surface roughness having an $R_a$ which is within the range of 20 to 30 microinches, as measured with a profilometer having a chisel tip.

20. The clutch plate as specified in claim 14 wherein the clutch plate is further comprised of a plurality of lubricating grooves.

* * * * *